(12) United States Patent
Komma et al.

(10) Patent No.: US 7,800,987 B2
(45) Date of Patent: Sep. 21, 2010

(54) OPTICAL PICKUP DRIVING APPARATUS AND OPTICAL PICKUP BEAM SPOT POSITIONING METHOD

(75) Inventors: Yoshiaki Komma, Osaka (JP); Akira Yoshikawa, Nara (JP)

(73) Assignee: Panasonic Corporation, Osaka (JP)

( * ) Notice: Subject to any disclaimer, the term of this patent is extended or adjusted under 35 U.S.C. 154(b) by 1399 days.

(21) Appl. No.: 10/550,539

(22) PCT Filed: Sep. 29, 2004

(86) PCT No.: PCT/JP2004/014673

§ 371 (c)(1),
(2), (4) Date: Sep. 22, 2005

(87) PCT Pub. No.: WO2005/034112

PCT Pub. Date: Apr. 14, 2005

(65) Prior Publication Data

US 2006/0203628 A1      Sep. 14, 2006

(30) Foreign Application Priority Data

Oct. 3, 2003   (JP) ............................. 2003-345398

(51) Int. Cl.
  *G11B 7/00*   (2006.01)
(52) U.S. Cl. .................. 369/44.25; 369/44.11
(58) Field of Classification Search .............. None
  See application file for complete search history.

(56) References Cited

U.S. PATENT DOCUMENTS

| | | | |
|---|---|---|---|
| 5,859,824 A | 1/1999 | Izumi et al. | |
| 5,974,009 A | 10/1999 | Tamura et al. | |
| 6,246,646 B1 * | 6/2001 | Abe et al. | 369/44.27 |
| 7,031,233 B2 * | 4/2006 | Ichimura | 369/44.11 |

(Continued)

FOREIGN PATENT DOCUMENTS

CN          1318830 A          10/2001

(Continued)

OTHER PUBLICATIONS

International Search Report for application No. PCT/JP2004/014673 dated Nov. 30, 2004.

(Continued)

*Primary Examiner*—Lixi Chow
(74) *Attorney, Agent, or Firm*—RatnerPrestia

(57) ABSTRACT

In an optical pickup driving apparatus and method, a moving device is controlled when an objective lens is moved toward a recording surface and it is detected that the voltage of the focus error signal has reached a slice level voltage H corresponding to displacement of predetermined magnitude from a reference potential E. The objective lens is moved toward the recording surface by a maximum of an upper limit of a predetermined amount of movement and when the amount of movement of the objective lens reaches the predetermined amount of movement, so as to move the objective lens away from the recording surface. And when it is detected during a period of backward movement of the objective lens, that the voltage of the focus error signal has reached the second slice level voltage H corresponding to displacement of predetermined magnitude from the reference potential E, control of beam spot positioning is performed so as to focus an optical spot.

29 Claims, 15 Drawing Sheets

U.S. PATENT DOCUMENTS

| | | | |
|---|---|---|---|
| 7,145,842 B2 * | 12/2006 | Kobayashi | 369/44.11 |
| 7,333,412 B2 * | 2/2008 | Manoh et al. | 369/53.23 |
| 2001/0008506 A1 * | 7/2001 | Takeya et al. | 369/44.29 |
| 2001/0030915 A1 | 10/2001 | Suzuki | |
| 2003/0012109 A1 * | 1/2003 | Tsai | 369/53.28 |
| 2003/0151991 A1 * | 8/2003 | Kitani et al. | 369/47.13 |
| 2004/0105358 A1 * | 6/2004 | Watanabe et al. | 369/44.29 |

FOREIGN PATENT DOCUMENTS

| | | |
|---|---|---|
| EP | 0 717 401 A1 | 6/1996 |
| JP | 09-161284 | 6/1997 |
| JP | 10-55602 A | 2/1998 |
| JP | 10-188294 A | 7/1998 |
| JP | 2001-325734 A | 11/2001 |
| JP | 2001-344768 A | 12/2001 |
| JP | 2002-373431 A | 12/2002 |
| WO | WO 03010761 A1 * | 2/2003 |

OTHER PUBLICATIONS

Supplementary European Search Report for EP 04 78 8448, filed Mar. 13, 2009.

* cited by examiner

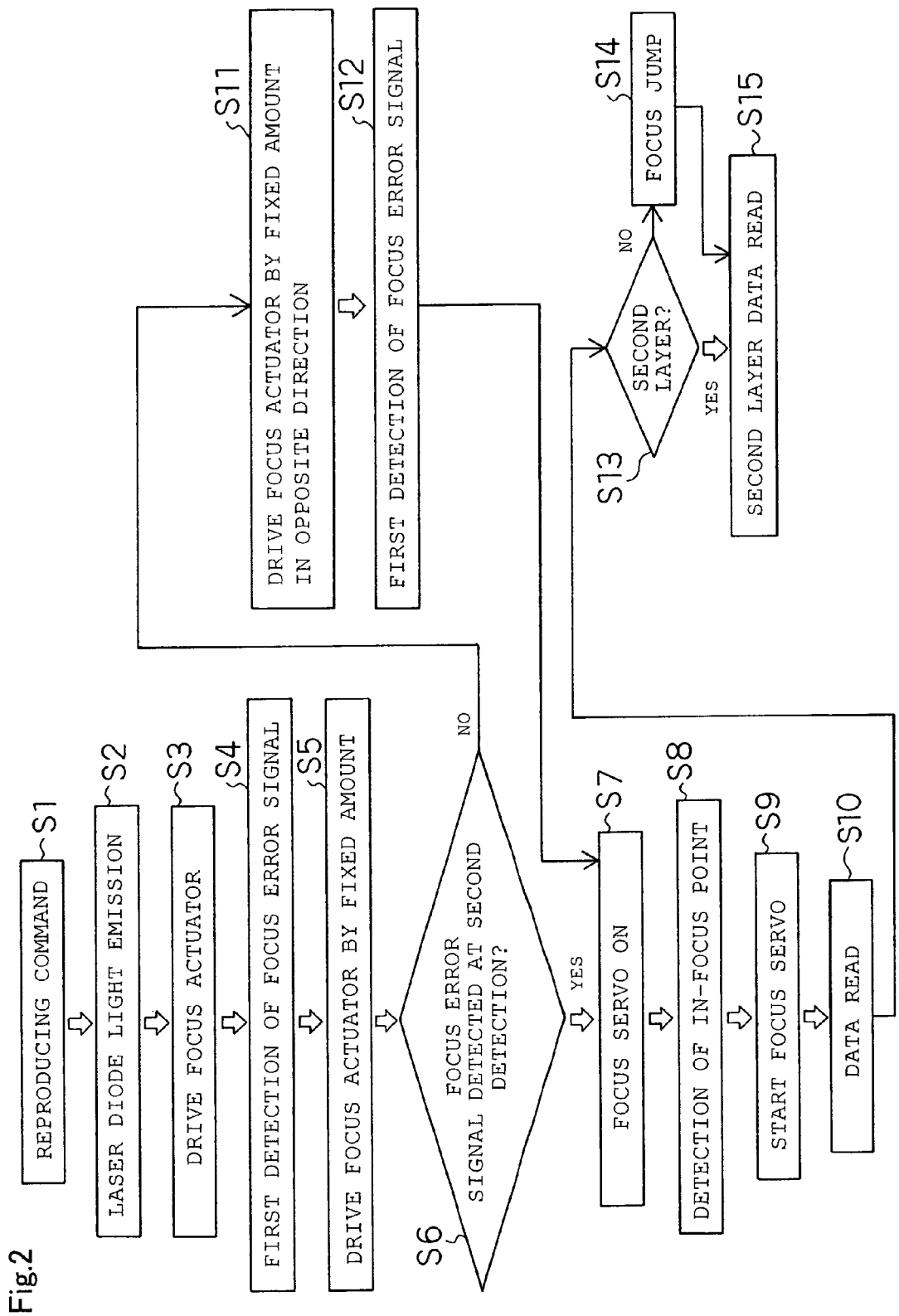

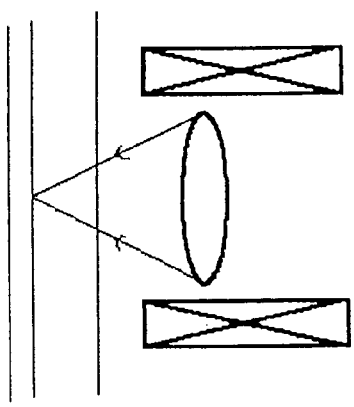
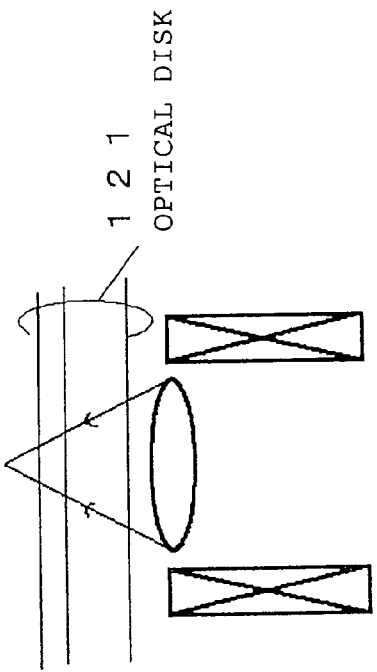
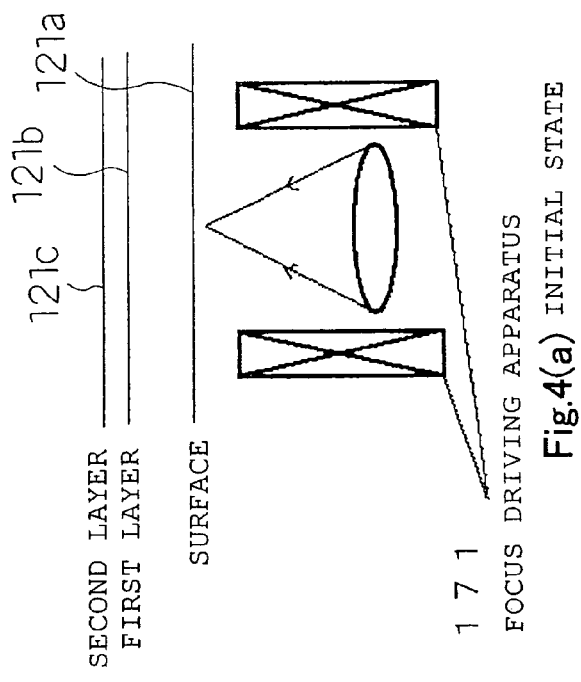
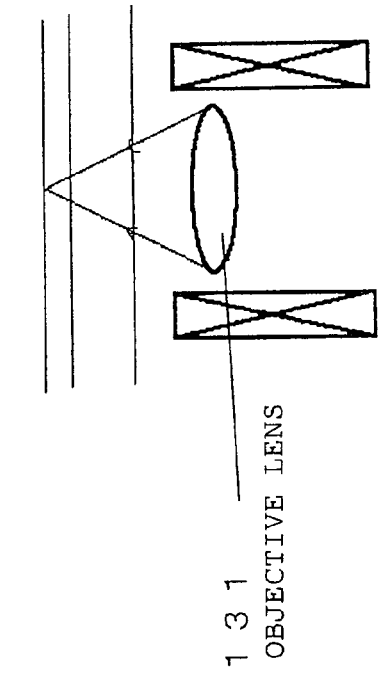
Fig.4(a) INITIAL STATE
Fig.4(b) FIRST LAYER FOCUS SIGNAL DETECTED
Fig.4(c) SECOND LAYER FOCUS SIGNAL DETECTED
Fig.4(d) SECOND LAYER PASSED

US 7,800,987 B2

1

OPTICAL PICKUP DRIVING APPARATUS AND OPTICAL PICKUP BEAM SPOT POSITIONING METHOD

This Application is a U.S. National Phase Application of PCT International Application PCT/JP2004/014673.

TECHNICAL FIELD

The present invention relates to an optical pickup driving apparatus and optical pickup beam spot positioning method, etc., used for an optical information recording/reproducing apparatus (optical information apparatus) which records/reproduces or erases information stored in an optical information recording medium such as an optical disk.

BACKGROUND ART

An optical memory technology using an optical disk having a pit-shaped pattern as a high-density, large-volume storage medium has been put to practical use with its application range being expanded to a digital audio disk, video disk, document file disk, data file, and so on. The function of successfully recording/reproducing information onto/from an optical disk through a finely narrowed light beam with a high degree of reliability can be roughly divided into a condensing function for forming a micro spot narrowed down to a diffraction limit, optical system focus control (focus servo), tracking control and pit signal (information signal) detection.

In recent years, with the advance in optical system design technologies and shortened wavelengths of a semiconductor laser serving as a light source, an optical disk having a higher-density storage capacity than a conventional one is being developed. As an approach to realizing higher-density storage capacities, a method of increasing numerical aperture (NA) at the side of the optical disk in a condensing optical system which condenses a light beam on the optical disk to a micro level is under study. The problem in that case is an increase in the amount of aberration due to an inclination (so-called tilt) of an optical axis. Increasing NA increases the amount of aberration which occurs due to tilt. To prevent this, the thickness of the substrate (base material) of the optical disk may be reduced.

A compact disk (CD) which can be said to be the first generation optical disk uses infrared light (wavelength λ3: 780 nm to 820 nm), an objective lens having an NA of 0.45 and has a disk base material of 1.2 mm in thickness. The DVD, the second generation, uses red light (wavelength λ2: 630 nm to 680 nm, standard wavelength 650 nm), an objective lens having an NA of 0.6 and a disk base material of 0.6 mm in thickness. The optical disk, the third generation, uses blue light (wavelength λ1: 390 nm to 415 nm, standard wavelength 405 nm), an objective lens having an NA of 0.85 and a disk base material of 0.1 mm in thickness.

In the present specification, the base material thickness refers to a distance from the plane onto which a light beam impinges in the optical disk used as an information recording medium to the information recording surface of the optical disk.

Furthermore, for the purpose of realizing a larger-capacity optical disk, a disk having a multi-layer structure with two or more recording layers is available on the market or under study.

When focus control is applied to such a disk having a multi-layer structure, or focus control is initially applied from a state in which focus servo is not functioning yet, that is, beam spot positioning is performed, it is important to focus on

2 a desired recording layer in which data such as various disk characteristics is written and position the beam spot, also for the purpose of shortening a wait time until an operation is started.

A conventionally proposed beam spot positioning method for a two-layer optical disk will be explained below.

FIG. 10 is an optical information apparatus which records/reproduces data onto/from a two-layer optical disk according to a conventional technology. In FIG. 10, a two-layer optical disk 109 is placed on a turn table 182 and rotated by a motor 164 as a rotation system. An optical head apparatus 155 is roughly moved to a track in which desired information of the two-layer optical disk 109 exists by a driving apparatus 151 of the optical head apparatus.

The optical head apparatus 155 also sends a focus error signal or tracking error signal to an electric circuit 153 in accordance with the positional relationship with the two-layer optical disk 109. In response to this signal, the electric circuit 153 sends a signal for inching an objective lens to the optical head apparatus 155. According to this signal, the optical head apparatus 155 carries out focus control or tracking control on the two-layer optical disk 109 and the optical head apparatus 155 reads, writes or erases information.

FIG. 11 is a flow chart showing a beam spot positioning method for the conventional two-layer optical disk, FIG. 12 illustrates a focus error signal waveform and FIG. 13 illustrates a positional relationship between the optical disk and objective lens during beam spot positioning for the conventional two-layer optical disk. In FIG. 13, reference numeral 120 denotes a two-layer optical disk whose information recording layer has a two-layer structure made up of a first layer 120b and a second layer 120c and 130 denotes an objective lens. Reference numeral 170 denotes a focus driving apparatus which drives the objective lens 130 in a direction perpendicular to a principal plane including a surface 120a of the two-layer optical disk 120 and corresponds to the driving apparatus 151 in FIG. 10. Furthermore, as shown in FIG. 12, the focus error signal is a signal whose voltage fluctuates in a positive or negative direction in the vicinity of the recording surface with respect to a predetermined reference voltage E according to the distance from the objective lens 130 and two-layer optical disk 120.

Hereinafter, a case of reproduction of information will be explained as an example according to the flow chart in FIG. 11. When a reproduction command on the two-layer optical disk 120 is issued (S101), a laser diode (not shown) is caused to emit light (S102), then the focus driving apparatus 170 is driven (S103) and the objective lens 130 is moved within a predetermined movement range. The electric circuit 153 turns ON the focus servo (S104) and monitors the focus error signal of the first layer shown by a waveform A in FIG. 12 when the objective lens 130 is moving. When it is detected that the objective lens has reached point B in FIG. 11 which is an in-focus point of the first layer 120b (S105), the focus servo is started (S106) using this focus error signal of the first layer 120b as a control signal, a focus jump is made to point D in FIG. 11 which is the position of the in-focus point of the first layer 120c (S107) (this operation is carried out as a movement of the objective lens 130 from a state in which the beam spot is positioned at the first layer 120b shown in FIG. 13(b) to a state in which the beam spot is positioned at the second layer 120c shown in FIG. 13(c)), the focus servo is started (S108) using the focus error signal of the second layer 120c shown by a waveform C in FIG. 12 as a control signal and a data read of the second layer is carried out (S109).

According to the beam spot positioning method for the above described two-layer optical disk, when a data read is performed from the second layer 120c, the focus servo of the first layer 120b is started first, and then a focus jump is made to start the focus servo for the second layer 120c. For this reason, a time is required until a data read of the second layer.

Thus, a beam spot positioning method intended to make data access in a shorter time using a drive apparatus which records/reproduces data onto/from a two-layer optical disk is disclosed in Japanese Patent Laid-Open No. 9-161284. The structure of the optical information apparatus which performs beam spot positioning is the same as that of the conventional example shown in FIG. 10 and only the control operation is different, and so detailed explanations thereof will be omitted.

FIG. 14 is a flow chart showing a beam spot positioning method for a two-layer optical disk of the conventional example, FIG. 15 illustrates a focus error signal waveform and FIG. 13 illustrates the positional relationship between the two-layer optical disk 120 and objective lens 130 during beam spot positioning. Hereinafter, a case of reproduction of information will be explained as an example according to the flow chart in FIG. 14.

When a reproduction command for the two-layer optical disk 120 is issued (S201), the laser diode is caused to emit light (initial state shown in FIG. 13(a)) (S202). Then, the focus driving apparatus 170 moves the objective lens 130 in a direction perpendicular to the information recording surface of the two-layer optical disk 120 within a predetermined range of distance (S203). As the objective lens 130 moves, the electric circuit 153 starts to detect the focus error signal of the first layer 120b shown by a signal waveform A in FIG. 15 (S204), and detects a period G during which the voltage of the focus error signal is lower than a predetermined focus error signal detection slice level voltage F of the first layer 120b.

Then, when a time point H at which the focus error signal voltage falls below the first layer focus error signal detection slice level voltage F is detected again, the focus servo is turned ON (S205).

Next, the focus error signal C of the second layer 120c indicated by a signal waveform C in FIG. 15 is monitored and if it is detected that the objective lens 130 has reached the position corresponding to an in-focus point D of the second layer 120c (S206), the focus servo is started using the second layer focus error signal C as a control signal (S208) and a data read of the second layer is performed (S209).

However, the above described conventional beam spot positioning method has the following problems. That is, as shown in FIG. 15, the focus error signals of the first layer 120b and second layer 120c are detected by detecting the waveforms A, B, but this detection is performed by detecting the voltage at a peak of the waveform or a position corresponding to predetermined displacement from a focus error signal reference voltage E. At this time, if, for example, the reflective index of the second layer 120c is low and the peak and voltage corresponding to the focus error signal of the second layer 120c cannot be detected, the objective lens 130 may continue to move in search of the focus error signal of the second layer, and collide with the optical disk 120, causing damage to the objective lens 130 or optical disk 120.

Furthermore, when the reflective index of the first layer 120b is low and the focus error signal of the first layer 120b cannot be detected for the same reason as that described above, the focus error signal of the second layer 120c may be mistaken for the focus error signal of the first layer and the objective lens 130 may continue to move in search of the (inexistent) focus error signal of the second layer 120c, and finally collide with the optical disk 120, causing damage to the objective lens 130 or optical disk 120.

DISCLOSURE OF INVENTION

The present invention has been implemented in view of the above described problems and it is an object of the present invention to provide an optical pickup driving apparatus and optical pickup beam spot positioning method, etc., capable of performing beam spot positioning to a recording layer of the deepest part of a multi-layer disk in a short time and reliably.

In order to achieve the above object, the $1^{st}$ aspect of the present invention is an optical pickup driving apparatus for focusing an optical spot on a single-layer recording surface or a plurality of multi-layered recording surfaces of an optical information recording medium, comprising:

moving means of moving an objective lens for focusing said optical spot on said recording surface of said optical information recording medium in a direction of the optical axis of said optical spot; and control means of controlling said moving means based on a voltage of a focus error signal based on reflected light from said optical spot, wherein said control means controls said moving means so that said moving means moves said objective lens toward said recording surface, and when said control means detects that the voltage of said focus error signal has reached a first slice level voltage corresponding to displacement of predetermined magnitude from a reference potential, said moving means moves said objective lens toward said recording surface by a maximum of an upper limit of a predetermined amount of movement, and when the amount of movement of said objective lens has reached said predetermined amount of movement, said moving means moves said objective lens away from said recording surface, and when said control means detects that said objective lens has reached a second slice level voltage corresponding to displacement of predetermined magnitude from the reference potential for the period of said backward movement, said control means controls beam spot positioning so as to focus the optical spot.

The $2^{nd}$ aspect of the present invention is the optical pickup driving apparatus according to the $1^{st}$ aspect of the present invention, wherein when said control means newly detects that the voltage of said focus error signal has reached a third slice level voltage corresponding to displacement of predetermined magnitude from said reference potential before the amount of movement of said objective lens reaches said predetermined amount of movement, said control means controls beam spot positioning so as to focus the optical spot.

The $3^{rd}$ aspect of the present invention is the optical pickup driving apparatus according to the $1^{st}$ or the $2^{nd}$ aspect of the present invention, wherein the voltage of said focus error signal alters in positive and negative directions with respect to said reference potential according to the movement of said objective lens, and The $4^{th}$ aspect of the present invention is the optical pickup driving apparatus according to the $3^{rd}$ aspect of the present invention, wherein said control means uses the voltage higher or lower than said reference potential as said first slice level voltage, whichever is detected first.

The $5^{th}$ aspect of the present invention is the optical pickup driving apparatus according to the $1^{st}$ or the $2^{nd}$ aspect of the present invention, wherein the voltage of said focus error signal fluctuates in positive and negative directions with respect to said reference potential according to the movement of said objective lens, and said control means detects both a voltage higher and lower than said reference potential as said first slice level voltage.

The 6th aspect of the present invention is the optical pickup driving apparatus according to the 1st or the 2nd aspect of the present invention, wherein said control means detects either a voltage higher or lower than said reference potential as said second slice level voltage or said third slice level voltage.

The 7th aspect of the present invention is the optical pickup driving apparatus according to the 6th aspect of the present invention, wherein said control means uses the voltage higher or lower than said reference potential as said second slice level voltage or said third slice level voltage, whichever is detected first.

The 8th aspect of the present invention is the optical pickup driving apparatus according to the 1st or the 2nd aspect of the present invention, wherein the magnitudes of displacement of said first slice level voltage, said second slice level voltage and said third slice level voltage from said reference potential are substantially the same.

The 9th aspect of the present invention is the optical pickup driving apparatus according to the 1st or the 2nd aspect of the present invention, wherein the magnitude of displacement of said first slice level voltage from said reference potential is greater than the magnitude of displacement of said second slice level voltage and said third slice level voltage from said reference potential.

The 10th aspect of the present invention is the optical pickup driving apparatus according to the 9th aspect of the present invention, wherein the magnitudes of displacement of said second slice level voltage and said third slice level voltage from said reference potential are substantially the same.

The 11th aspect of the present invention is the optical pickup driving apparatus according to the 1st or the 2nd aspect of the present invention, wherein said predetermined amount of movement is given by a moving distance L from the current position of said optical pickup when said first slice level voltage is reached and said moving distance L is defined by:

$$L = d/n \times (1+c) \quad \text{(Formula 1)}$$

where d is a maximum value of the distance between said recording layers of said optical information recording medium, n is a refractive index of said optical information recording medium, and c is a sensitivity difference.

The 12th aspect of the present invention is the optical pickup driving apparatus according to the 1st or the 2nd aspect of the present invention, wherein when said control means detects that the voltage of said focus error signal has reached a fourth slice level voltage at which the displacement from said reference potential is greater than the displacement of said first slice level voltage from said reference potential, said control means controls beam spot positioning so as to focus said optical spot.

The 13th aspect of the present invention is the optical pickup driving apparatus according to the 1st or the 2nd aspect of the present invention, wherein said control means is formed on an integrated circuit.

The 14th aspect of the present invention is an optical information reproducing apparatus provided with means of reading information recorded in an optical information recording medium, said reading means using the optical pickup driving apparatus according to the 1st or the 2nd aspect of the present invention.

The 15th aspect of the present invention is an optical information recording apparatus provided with recording means of recording information in an optical information recording medium, said recording means using the optical pickup driving apparatus according to the 1st or the 2nd aspect of the present invention.

The 16th aspect of the present invention is an optical information recording/reproducing apparatus provided with recording/reproducing means of recording and/or reproducing information in/from an optical information recording medium, said recording/reproducing means using the optical pickup driving apparatus according to the 1st or the 2nd aspect of the present invention.

The 17th aspect of the present invention is an optical pickup beam spot positioning method for focusing an optical spot on a single-layer recording surface or a plurality of multi-layered recording surfaces of an optical information recording medium, comprising:

a moving step of moving an objective lens for focusing said optical spot on said recording surface of said optical information recording medium in a direction of the optical axis of said optical spot; and a control step of controlling said moving means based on a voltage of a focus error signal based on reflected light from said optical spot, wherein said control step controls said moving step so that said objective lens moves toward said recording surface, and when it is detected that the voltage of said focus error signal has reached a first slice level voltage corresponding to displacement of predetermined magnitude from a reference potential, said objective lens moves toward said recording surface by a maximum of an upper limit of a predetermined amount of movement, and when the amount of movement of said objective lens has reached said predetermined amount of movement, said objective lens moves away from said recording surface, and when it is detected that said objective lens has reached a second slice level voltage corresponding to displacement of predetermined magnitude from the reference potential for the period of said backward movement, said control step controls beam spot positioning so as to focus the optical spot.

The 18th aspect of the present invention is the optical pickup beam spot positioning method according to the 17th aspect of the present invention, wherein in said control step, when it is newly detected that the voltage of said focus error signal has reached a third slice level voltage corresponding to displacement of predetermined magnitude from said reference potential before the amount of movement of said objective lens reaches said predetermined amount of movement, control of beam spot positioning is performed so as to focus the optical spot.

The 19th aspect of the present invention is the optical pickup beam spot positioning method according to the 17th or the 18th aspect of the present invention, wherein the voltage of said focus error signal fluctuates in positive and negative directions with respect to said reference potential according to the movement of said objective lens, and in said control step, either a voltage higher or lower than said reference potential is detected as said first slice level voltage.

The 20th aspect of the present invention is the optical pickup beam spot positioning method according to the 19th aspect of the present invention, wherein in said control step, the voltage higher or lower than said reference potential is used as said first slice level voltage, whichever is detected first.

The 21st aspect of the present invention is the optical pickup beam spot positioning method according to the 17th or the 18th aspect of the present invention, wherein the voltage of said focus error signal fluctuates in positive and negative directions with respect to said reference potential according to the movement of said objective lens, and in said control step, both a voltage higher and lower than said reference potential are detected as said first slice level voltage.

The 22$^{nd}$ aspect of the present invention is the optical pickup beam spot positioning method according to the 17$^{th}$ or the 18$^{th}$ aspect of the present invention, wherein in said control step, either a voltage higher or lower than said reference potential is detected as said second slice level voltage or said third slice level voltage.

The 23$^{rd}$ aspect of the present invention is the optical pickup beam spot positioning method according to the 22$^{nd}$ aspect of the present invention, wherein in said control step, the voltage higher or lower than said reference potential is used as said second slice level voltage or said third slice level voltage, whichever is detected first.

The 24$^{th}$ aspect of the present invention is the optical pickup beam spot positioning method according to the 17$^{th}$ or the 18$^{th}$ aspect of the present invention, wherein the magnitudes of displacement of said first slice level voltage, said second slice level voltage and said third slice level voltage from said reference potential are substantially the same.

The 25$^{th}$ aspect of the present invention is the optical pickup beam spot positioning method according to the 17$^{th}$ or the 18$^{th}$ aspect of the present invention, wherein the magnitude of displacement of said first slice level voltage from said reference potential is greater than the magnitudes of displacement of said second slice level voltage and said third slice level voltage from said reference potential.

The 26$^{th}$ aspect of the present invention is the optical pickup beam spot positioning method according to the 25$^{th}$ aspect of the present invention, wherein the magnitudes of displacement of said second slice level voltage and said third slice level voltage from said reference potential are substantially the same.

The 27$^{th}$ aspect of the present invention is the optical pickup beam spot positioning method according to the 17$^{th}$ or the 18$^{th}$ aspect of the present invention, wherein said predetermined amount of movement is given by a moving distance L from the current position of said optical pickup when said first slice level voltage is reached and said moving distance L is defined by:

$$L = d/n \times (1+c) \quad \text{(Formula 1)}$$

where d is a maximum value of the distance between said recording layers of said optical information recording medium, n is a refractive index of said optical information recording medium, and c is a sensitivity difference.

The 28$^{th}$ aspect of the present invention is the optical pickup beam spot positioning method according to the 17$^{th}$ or the 18$^{th}$ aspect of the present invention, wherein in said control step, when it is detected that the voltage of said focus error signal has reached a fourth slice level voltage at which the displacement from said reference potential is greater than the displacement of said first slice level voltage from said reference potential, control of beam spot positioning is performed so as to focus said optical spot.

The 29$^{th}$ aspect of the present invention is a program for causing a computer to function as control means of controlling said moving means based on a voltage of a focus error signal based on reflected light from said optical spot of the optical pickup driving apparatus according to the 1$^{st}$ aspect of the present invention.

The 30$^{th}$ aspect of the present invention is a recording medium carrying the program according to the 29$^{th}$ aspect of the present invention, said recording medium being processable by a computer.

The present invention exerts the notable effect of being able to perform beam spot positioning to a recording layer of the deepest part of a multi-layer disk in a short time and reliably.

BRIEF DESCRIPTION OF DRAWINGS

FIG. 2 illustrates a flow chart showing a beam spot positioning method according to Embodiment 1 of the present invention;

FIGS. 4(a), (b), (c) and (d) are schematic cross-sectional views of a positional relationship between an optical disk and objective lens of each Embodiment of the present invention;

Figure 1A:
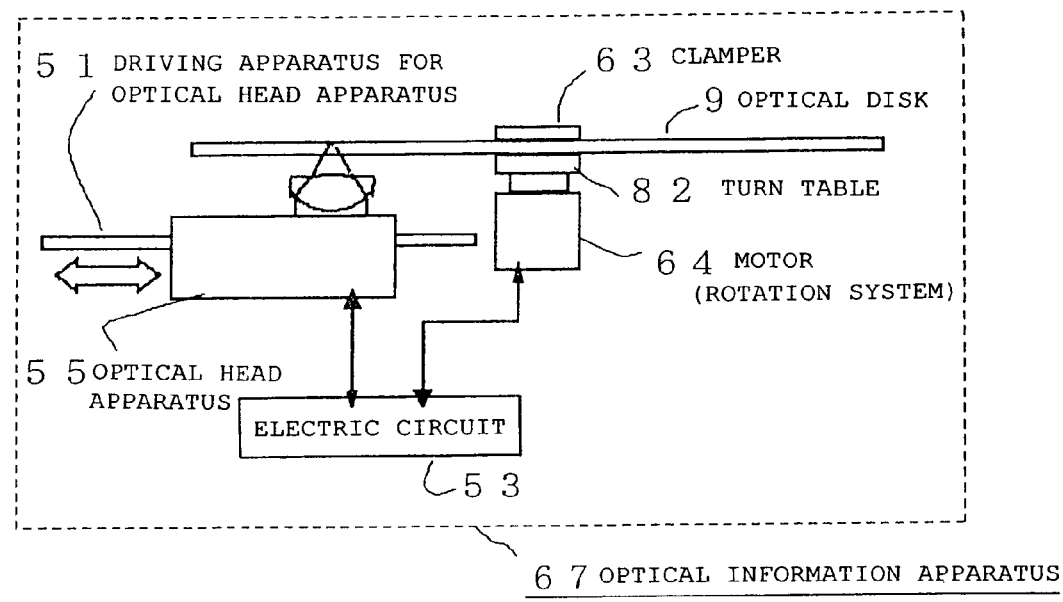
FIG. 1(a) is a schematic cross-sectional view of an optical information apparatus according to Embodiments 1 to 6 of the present invention.

DESCRIPTION OF SYMBOLS 9, 121 Optical disk
131 Objective lens
171 Focus driving apparatus
51 Driving apparatus of optical head apparatus
53 Electric circuit
55 Optical head apparatus
61 Output apparatus
64 Arithmetic unit
65 Input apparatus
66 Decoder
67 Optical information apparatus
68 Encoder
69 Input/output terminal
77 optical disk player (or car navigation system)

100 Computer
110 Optical disk recorder
130 Optical disk server

BEST MODE FOR CARRYING OUT THE INVENTION

With reference now to the attached drawings, embodiments of the present invention will be explained below.

EMBODIMENT 1

FIG. 1(a) is an optical information apparatus according to Embodiment 1 of the present invention. In FIG. 1, an optical disk 9 is placed on a turn table 82 and rotated by a motor 64. An optical head apparatus 55 is roughly moved to a track in which desired information of the optical disk exists by a driving apparatus 51 of the optical head apparatus.

The optical head apparatus 55 also sends a focus error signal or tracking error signal to an electric circuit 53 in accordance with the positional relationship with the optical disk 10. In response to this signal, the electric circuit 53 sends a signal for inching an objective lens to the optical head apparatus 55. According to this signal, the optical head apparatus 55 carries out focus control and tracking control on the optical disk 9 and the optical head apparatus 55 reads, writes or erases information.

Figure 1B:
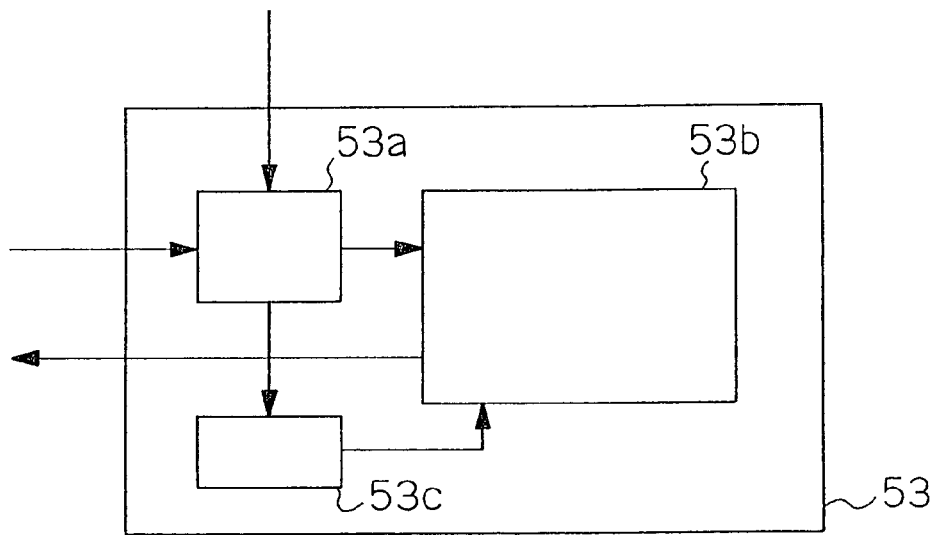
FIG. 1(b) is a block diagram of an electric circuit 53 of the optical information apparatus according to Embodiments 1 to 6 of the present invention.

Next, FIG. 1(b) schematically shows the interior of the electric circuit 53. In the electric circuit 53, a decision circuit 53a is means of determining whether a focus error signal or tracking error signal obtained from the optical head apparatus 55 has reached a predetermined voltage or not and a control circuit 53b is means of performing control to drive various sections of the optical head apparatus 55 and when a decision is received from the decision circuit 53a, the control circuit 53b serves as means of performing control based on this decision. Furthermore, a memory 53c is means of storing the decision result of the decision circuit 53a as a history.

Figure 3:
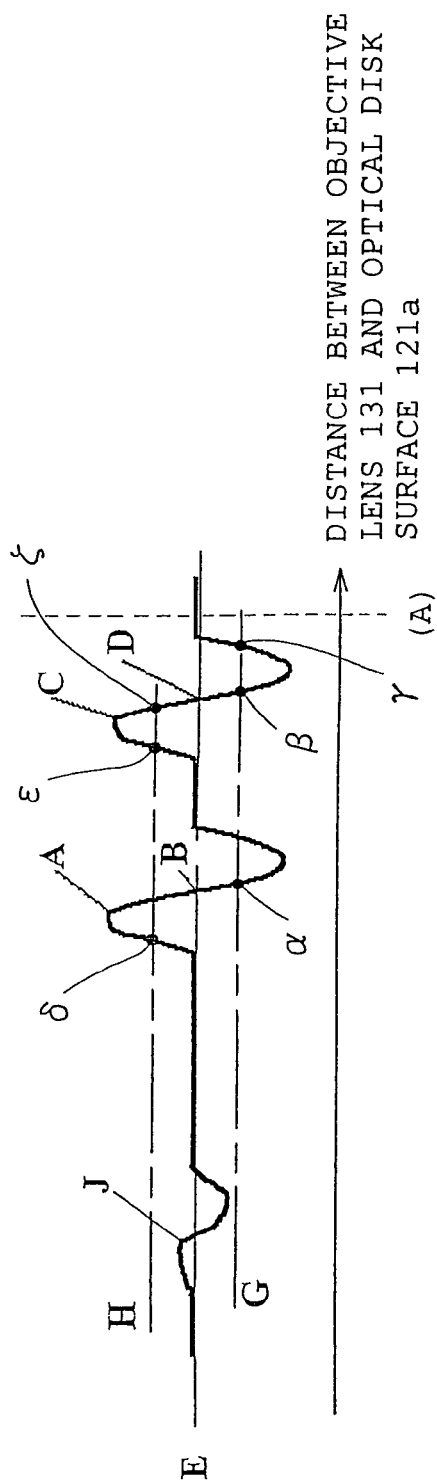
FIG. 3 illustrates a relationship between a focus error signal and slice level voltage according to Embodiments 1 to 4 of the present invention.

The operation of the optical information apparatus 67 having such a structure will be explained and an embodiment of the beam spot positioning method for an optical information recording medium of the present invention will be explained by taking a case where the optical disk 9 is a two-layer disk as an example according to FIGS. 2 to 4. FIG. 2 illustrates a flow chart showing a beam spot positioning method for a two-layer optical disk according to one embodiment of the present invention, FIG. 3 illustrates a focus error signal waveform, detected by the optical head apparatus 55 and FIG. 4 illustrates a positional relationship between a two-layer optical disk 121 and objective lens 131 during beam spot positioning.

When a command for reproduction from the optical disk is issued from the control circuit 53b of the electric circuit 53 (S1), a laser diode (not shown) provided in the optical head apparatus 55 is caused to emit light (initial state shown in FIG. 4(a)) (S2). Then, a focus driving apparatus 171 is driven (S3) and the objective lens 131 is moved in a direction perpendicular to the information recording surface of the optical disk. At this time, the objective lens 131 is moved by the focus driving apparatus 171 from a place far from the optical disk 9 to a place closer to the optical disk 9.

At the same time, the decision means 53b of the electric circuit 53 monitors a focus error signal detected when the objective lens 131 is moving. As shown in FIG. 3, the voltage of the focus error signal fluctuates in a positive or negative direction in the vicinity of a disk surface 121a, first layer 121b and second layer 121c with respect to a predetermined reference voltage E according to the distances from the objective lens 131 and optical disk 9. The decision means 53b detects a time point α at which the voltage of this focus error signal falls below a predetermined focus error signal detection slice level voltage G (S4) and stores the detection event in the memory 53c in the electric circuit 53 as a history. Then, in response to this detection, the control means 53b sets a limit value ($L_{lim}$) of an allowable amount of movement of the objective lens 131 (S5).

It is desirable that the absolute value of the difference between the focus error signal detection slice level voltage G and reference voltage E be ⅓ to ⅔ of the amplitude of a standard focus error signal voltage. This is intended to avoid the focus error signal of the optical disk surface 121a detected in the state in FIG. 4(a) and indicated by a waveform J in FIG. 3 from being mistaken for the focus error signal of the first layer 121b.

The objective lens 131 continues to approach the optical disk 9 and during that period of time the decision means 53b of the electric circuit 53 determines whether the voltage of the focus error signal has fallen below the focus error signal detection slice level voltage G or not in the meantime (S6). When it is detected that the voltage of the focus error signal has fallen below the focus error signal detection slice level voltage G again, the focus servo control is turned ON for the first time (S7). At this time, as shown in FIG. 3, the detection time point is β on the waveform C of the focus error signal of the second layer 121c.

Next, the position D of an in-focus point of the second layer 121c is detected (S8), the focus servo is started (S9) using the focus error signal of the second layer 122 indicated by a waveform C in FIG. 3 as a control signal and a data read is performed (S10). Whether the recorded information belongs to the second layer 121c or not is determined by information processing apparatus (not shown), connected to the optical information apparatus, or the electric circuit 53 from the contents of the data read through the data read (S13). If the contents are correct, the data read continues (S15) and if incorrect, the control means 53b performs control for making a focus jump again (S14) and performs a data read from the second layer 121c again (S15). In a focus jump here, the focus servo is turned OFF, the objective lens 131 is moved closer to the optical disk 9 and the focus servo is turned ON again when the focus error signal level has changed by a predetermined value or more with respect to a reference voltage. At this time, by setting a voltage whose difference from the reference voltage is smaller than the slice level voltage G as a new slice level voltage, a reliable jump is made. In the case of an optical disk having three or more recording layers, it is possible to reach a desired recording layer by repeating focus jumps.

On the other hand, even if the objective lens 131 is moved to the limit value ($L_{lim}$) of the allowable amount of movement, if it is not determined that the voltage of the focus error signal has fallen below the focus error signal detection slice level voltage G, the control means 53b of the driving circuit 53 performs control so as to move the objective lens 131 away from the principal plane of the two-layer optical disk 121 from the position of limit value ($L_{lim}$) (S11).

The decision means 53b of the electric circuit 53 monitors the focus error signal detected when the objective lens 131 is moving away from the disk, determines whether the voltage falls below the focus error signal detection slice level voltage G again or not and detects the time point at which it falls below the focus error signal detection slice level voltage G (S12). After the detection, the operations in steps S7 to S15 are executed and a data read is performed from the second layer 121c.

The above described operation will be explained in further detail. According to this embodiment, once a focus error signal is detected, the limit value ($L_{lim}$) of the allowable amount of movement is set, the maximum approach position of the objective lens 131 is confirmed as a position (A) as shown in FIG. 3 and if no new focus error signal is detected even at the position, the objective lens 131 starts to move away from the disk.

The mode of beam spot positioning after the backward movement differs as shown below depending on the detection condition of the focus error signal:

(1) When the peaks and voltage corresponding to the focus error signal of the first layer 121*b* are detected but the peaks and voltage corresponding to the focus error signal of the second layer 121*c* cannot be detected:

The decision means 53*b* determines in S12 above that the focus error signal falls below the focus error signal detection slice level voltage G at a time point γ in the figure, the focus servo is turned ON (S7), operations in S8 to S13 and S15 are performed in that order and a data read from the second layer 121*c* is performed. That is, the optical head apparatus 55 detects the focus error signal of the first layer 121*b* once and then detects the focus error signal of the second layer 121*c* once, and can thereby detect an in-focus point D and execute a data read from the second layer 121*c* appropriately.

(2) When the peaks and voltage corresponding to the focus error signal of the first layer 121*b* are not detected but the peaks and voltage corresponding to the focus error signal of the second layer 121*c* are detected:

In this case, the focus error signal of the second layer 121*c* is mistaken for the first layer focus error signal, but the decision means 53*b* determines in S12 above that the focus error signal has fallen below the focus error signal detection slice level voltage G at the time point γ in the figure, the focus servo is turned ON (S7), operations in S9 to S13 and S15 are performed in that order with the in-focus point D regarded as a target for an in-focus detection in S8 and a data read is performed from the second layer 121*c*. That is, the optical head apparatus 55 detects the focus error signal of the second layer 121*c* twice, detects an in-focus point D and can execute a data read from the second layer 121*c* consequently.

As shown above, after a predetermined voltage signal is detected as the focus error signal for the first time, a limit value is set in the amount of movement of the objective lens 131, the objective lens is moved from there in the opposite direction to detect the focus error signal again, and it is thereby possible to avoid collision between the objective lens 131 and optical disk 121, reliably detect the focus error signal a plurality of times and apply the focus servo to the second layer directly and in a short time.

The limit value ($L_{lim}$) of the allowable amount of movement of the objective lens 131 can be set to an arbitrary distance from the position at which the optical head apparatus 55 starts to operate to the position at which the optical lens 131 contacts the surface of the optical disk 121 in principle, but it is desirable to omit unnecessary movement for speedy beam spot positioning.

Thus, according to this embodiment, a moving distance L from the current position at the time of the first detection of the focus error signal as a starting point is determined, the objective lens is moved closer to the disk by this moving distance L and then the objective lens is moved away from the disk. That is, in the two-layer optical disk 121, the moving distance L is set to a value obtained by dividing a maximum value d of the distance between two layers (between the first layer 121*b* and second layer 121*c*) by a refractive index n of the substrate material of the optical disk 121 and further adding a sensitivity difference c of the optical head apparatus 55 thereto. That is, the moving distance L from the first focus error signal detection point is defined using these parameters as:

$$L = d/n \times (1+c) \quad \text{(Formula 1)}$$

where c is approximately 0.1 to 0.3.

Furthermore, the distance between the surface of the objective lens 131 close to the disk when focus is achieved on the first layer 121*b* and the surface of the optical disk 121 is called a "working distance" (WD). By setting WD>L, it is possible to obtain the effect that the objective lens does not collide with the disk when the objective lens is being moved by a certain amount L, and therefore it is desirable to set WD>L.

In this way, it is possible to determine whether or not to achieve a second detection of the focus error signal within a period of approaching movement of the shortest distance from the time of the first detection of the focus error signal in S4 and realize speedy beam spot positioning.

In the foregoing explanations, the embodiment of a two-layer disk has been shown, but in the case of a multi-layer disk having three or more layers, it is also possible to realize speedy beam spot positioning to the recording layer in the deepest part through the same operation as that described above as far as the recording surface subject to beam spot positioning is in the deepest part of the optical disk. At this time, the moving distance L can be defined as follows. That is, L can be set to a value obtained by dividing the maximum value d of the distances between four layers by a refractive index n of the optical disk and adding a sensitivity difference c of the driving apparatus 51 thereto. That is, in the same way as the above expression, the following expression can be set:

$$L = d/n \times (1+c) \quad \text{(Formula 1)}$$

Assuming the number of recording layers is $N_L$, by turning ON the focus servo control immediately after detecting that the focus error signal exceeds the slice level voltage g, ($N_L - 1$) times when the objective lens is being moved by a certain amount L, it is also possible to realize beam spot positioning more speedily.

That is, in the case where the optical disk is a multi-layer disk having three or more layers, after a focus error signal is detected, the objective lens is brought closer to the optical disk by a certain amount and if the next focus error signal can be detected, the objective lens is sent further and if not, the objective lens is moved in the opposite direction and beam spot positioning is performed using the focus error signal detected immediately before. By determining this number of times, it is possible to perform direct beam spot positioning to a desired recording layer and avoid collision between the objective lens and optical disk.

EMBODIMENT 2

In Embodiment 1 above, the voltage G which is lower than the reference voltage E is used as the slice level voltage used to detect a focus error signal of each recording layer, but the slice level voltage is not limited to this.

As another example of the slice level voltage, the decision means 53*a* can also use a slice level voltage H which is higher than the reference voltage E to detect a time point at which a focus error signal being monitored exceeds this slice level voltage H for the first time as the time of detection of the first focus error signal in S4. In this case, as shown in FIG. 3, the time of the first detection of the focus error signal and the limit value ($L_{lim}$) of the allowable amount of movement of the objective lens 131 in S5 are set at a time point δ in the figure.

Furthermore, the time at which the objective lens 131 detects the focus error signal for the second time is a time point ε in the figure.

Furthermore, as another example of the slice level voltage, it is possible to use the above described slice level voltages G and H in no special order at the first detection of the focus error signal and the second detection of the focus error signal respectively. The operation in this case will be as follows:

(1) The slice level voltage G is used for the first detection of the focus error signal and the slice level voltage H is used for the second detection of the focus error signal.

At this time, as shown in FIG. 3, the time point of the first detection of the focus error signal and the limit value ($L_{lim}$) of the allowable amount of movement of the objective lens 131 in S5 are set at time point α in the figure, while the time point for the second detection of the focus error signal when there is no backward movement caused by the setting of the limit value ($L_{lim}$) of the allowable amount of movement of the objective lens 131 is a time point ε in the figure. Furthermore, the time point for the second detection of the focus error signal when there is backward movement is a time point ζ in the figure.

In this way, using the slice level voltages can shorten the time between the first detection of the focus error signal and second detection of the focus error signal and thereby realize speedy beam spot positioning.

(2) Next, the slice level voltage H is used for the first detection of the focus error signal and the slice level voltage G is used for the second detection of the focus error signal.

At this time, as shown in FIG. 3, the time point of the first detection of the focus error signal and the limit value ($L_{lim}$) of the allowable amount of movement of the objective lens 131 in S5 are set at the time point δ in the figure, while the time point for the second detection of the focus error signal when there is no backward movement caused by the setting of the limit value ($L_{lim}$) of the allowable amount of movement of the objective lens 131 is the time point β in the figure. Furthermore, the time point for the second detection of the focus error signal when there is backward movement is the time point γ in the figure.

EMBODIMENT 3

Furthermore, as a further example of the slice level voltage, it is possible to use the above described slice level voltages G and H in no special order for the backward movement caused by the setting of the limit value ($L_{lim}$) of the allowable amount of movement and approaching movement before the backward movement started respectively. The operation in this case will be as follows:

(1) The slice level voltage G is used to detect a focus error signal during approaching movement and the slice level voltage H is used to detect a focus error signal during backward movement.

At this time, as shown in FIG. 3, the time point of the first detection of the focus error signal (and the limit value ($L_{lim}$) of the allowable amount of movement of the objective lens 131 in S5) is set at the time point a in the figure, and the time point of the second detection of the focus error signal when there is no backward movement caused by the setting of the limit value ($L_{lim}$) of the allowable amount of movement of the objective lens 131 is the time point β in the figure, while the time point of the second detection of the focus error signal when there is backward movement is the time point ζ in the figure.

(2) The slice level voltage H is used to detect a focus error signal during approaching movement and the slice level voltage G is used to detect a focus error signal during backward movement.

At this time, as shown in FIG. 3, the time point of the first detection of the focus error signal (and the limit value ($L_{lim}$) of the allowable amount of movement of the objective lens 131 in S5) is set at the time point δ in the figure, and the time point of the second detection of the focus error signal when there is no backward movement caused by the setting of the limit value ($L_{lim}$) of the allowable amount of movement of the objective lens 131 is the time point ε in the figure, while the time point of the second detection of the focus error signal when there is backward movement is the time point γ in the figure. In this way, using the slice level voltages can shorten the time between the first detection of the focus error signal and second detection of the focus error signal when backward movement is necessary and thereby realize speedy beam spot positioning.

Embodiments 2, 3 assume that each of the slice level voltages H, G is used once for detection of the focus error signal and have enumerated their combinations, but it is desirable to give priority to the shortening of time required for detection when a beam spot positioning operation is actually performed. In the example shown in FIG. 3, the earliest one of the time points of the first detection of the focus error signal is the time point δ, that of the time point of the second detection of the focus error signal is the time point ε during approaching movement and time point γ during backward movement, and therefore as far as the slice level voltage is concerned, it is most efficient to perform the detection operation with the setting (2) in Embodiment 2.

EMBODIMENT 4

As a still further example of the slice level voltage, it is possible to use both the above described slice level voltages G and H for the first detection of the focus error signal and second detection of the focus error signal. The operation in this case will be as follows. That is, the time point of the first detection of the focus error signal and the limit value ($L_{lim}$) of the allowable amount of movement of the objective lens 131 in S5 are set at the time point α after checking the time point δ in the figure and the time point of the second detection of the focus error signal when there is no backward movement caused by the setting of the limit value ($L_{lim}$) of the allowable amount of movement of the objective lens 131 is further set at the time point γ after the time point ε in the figure was confirmed. Furthermore, the time point of the second detection of the focus error signal when there is backward movement is further set at the time point ζ after the time point γ in the figure was confirmed.

In this case, by detecting a focus error signal whose potential with respect to the reference voltage E is fluctuating in positive and negative directions from both the positive and negative sides, it is possible to reduce the possibility that errors caused by damage or spoiling etc., on the optical disk 9 may be mistaken for focus error signals and realize reliable beam spot positioning.

EMBODIMENT 5

Figure 5:
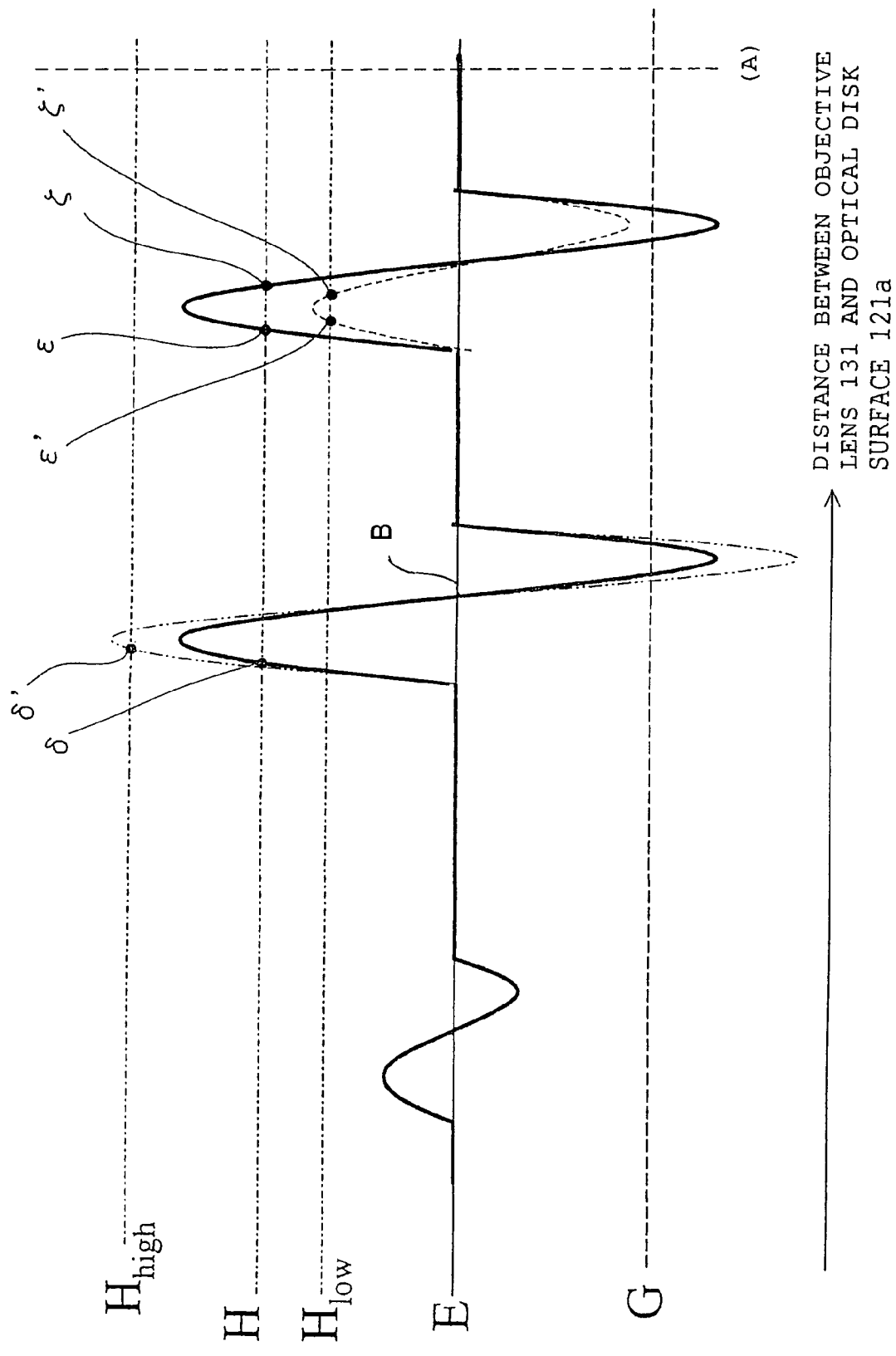
FIG. 5 illustrates a relationship between a focus error signal and slice level voltage according to Embodiments 5 and 6 of the present invention.

As a still further example of the slice level voltage, it is possible to differentiate the magnitude of the above described slice level voltage between backward movement caused by the setting of a limit value ($L_{lim}$) of the allowable amount of movement and approaching movement before the backward movement started. That is, it is possible to cause the magnitude of the slice level voltage used for the detection of the focus error signal during backward movement to be smaller than the magnitude of the slice level voltage used for the first detection of the focus error signal. As shown in FIG. 5, when the focus error signal is detected using the slice level voltage H, the first detection of the focus error signal is performed at time point δ. The second detection of the focus error signal should be performed originally at the time point ε, but if some trouble occurs for some reason, after the objective lens 131 is moved to the point (A) based on the limit value ($L_{lim}$) of the allowable amount of movement set at the first detection of the focus error signal, the objective lens 131 is moved away from the point (A) in the opposite direction and an attempt to detect the focus error signal is made again during the backward movement.

When the focus error signal is detected during backward movement, if the slice level voltage H is used in the same way as the first detection, the detection is performed at the time point ζ shown in FIG. 5, but when the failure of approaching movement is attributable to a reduction of the reflective index of the second layer 121c, for example, the voltage of the focus error signal itself has not reached the slice level voltage H as shown by the dotted line in FIG. 5, and therefore the focus error signal cannot be detected even during backward movement.

Thus, according to this embodiment, when the objective lens 131 starts backward movement, the decision means 53a sets the slice level voltage to a voltage $H_{low}$ which is lower than the slice level voltage H with respect to the reference voltage E, determines the time point at which the focus error signal being monitored exceeds this new $H_{low}$, and detects an in-focus point using the focus error signal at this time. For the focus error signal of the second layer 121b, a time point ζ' shown in the figure is the decision point.

Thus, this embodiment causes the magnitude of the slice level voltage during backward movement to be smaller than that during approaching movement, and can thereby detect the focus error signal of the second layer more reliably and perform speedy beam spot positioning.

In the explanations so far, the slice level voltage $H_{low}$ which is lower than the slice level voltage H with respect to the reference voltage E is used, but when the slice level G is used for the first detection of the focus error signal, a slice level voltage $G_{high}$ (not shown) which is higher than the slice level voltage G with respect to the reference voltage E can be used. In short, it is sufficient to set a slice level voltage which has smaller displacement than the displacement of the slice level voltage used for the first detection from the reference voltage. Furthermore, combined with Embodiments 2 to 4, when both slice level voltages G and H are used separately or together, it is possible to use the slice level voltages $H_{low}$, and $G_{high}$ for the second detection of the focus error signal during backward movement or approaching movement respectively.

In the explanations above, the slice level voltage $H_{low}$ is used to detect a focus error signal during backward movement, but the slice level voltage $H_{low}$ can also be used for the second detection of the focus error signal during approaching movement. In this case, the focus error signal can be detected at a time point ε' in FIG. 5, in which case backward movement is not necessary and beam spot positioning can be further sped up. Furthermore, as far as the displacement is smaller than the displacement of the slice level voltage from the reference potential used for the first detection of the focus error signal, the displacement from the reference voltage E can be differentiated between approaching movement and backward movement in the second detection of the focus error signal.

EMBODIMENT 6

When a single-layer disk having only one recording layer is used as the optical disk 9, speedy beam spot positioning may be realized as follows.

That is, in the case of a single-layer disk, compared to a multi-layer disk, the reflective index of the recording layer is larger and the voltage of the focus error signal is also larger, and therefore the decision means 53a sets $H_{high}$ at which the displacement from the reference potential E is higher than the slice level voltage H used for the first detection of the focus error signal, and after the focus error signal being monitored reaches the slice level voltage H and a movement limit is set, if it is detected that this slice level voltage $H_{high}$ has been reached, the decision means 53a detects an in-focus point. In FIG. 5, that slice level voltage $H_{high}$ has been reached is detected at the time point δ' and beam spot positioning is thereby performed to the in-focus point B of the first layer.

In the above described explanations, the slice level voltage H is used to detect the focus error signal, and therefore $H_{high}$ which is higher than the slice level voltage H is set, but it is also possible to set a voltage $G_{low}$ (not shown) which is lower than the slice level voltage G with respect to the reference voltage E as the one corresponding to the case where the slice level voltage G is used to detect a focus error signal. That is, it is possible to set the voltage of the focus error signal to a slice level voltage such that the displacement from the reference potential is greater than the displacement of the slice level voltage used for the first detection of the focus error signal from the reference potential and detect that this slice level voltage has been reached.

Furthermore, it is also possible to combine this embodiment with Embodiment 4 to set and detect both the slice level voltages $H_{high}$ and $G_{low}$.

EMBODIMENT 7

As examples of the optical information recording apparatus, optical information reproducing apparatus and optical information recording apparatus, an embodiment of a computer, etc., provided with the optical information apparatus 67 described in Embodiments 1 to 6 will be shown below.

A computer, optical disk player or optical disk recorder provided with the optical information apparatus of the above described embodiment or adopting the above described recording/reproducing method can perform beam spot positioning to a desired recording layer of a multilayer optical disk in a short time and prevent collision between the objective lens and optical disk, and can thereby realize a system with excellent operability with a shorter wait time before starting operation of the optical disk.

Figure 6:
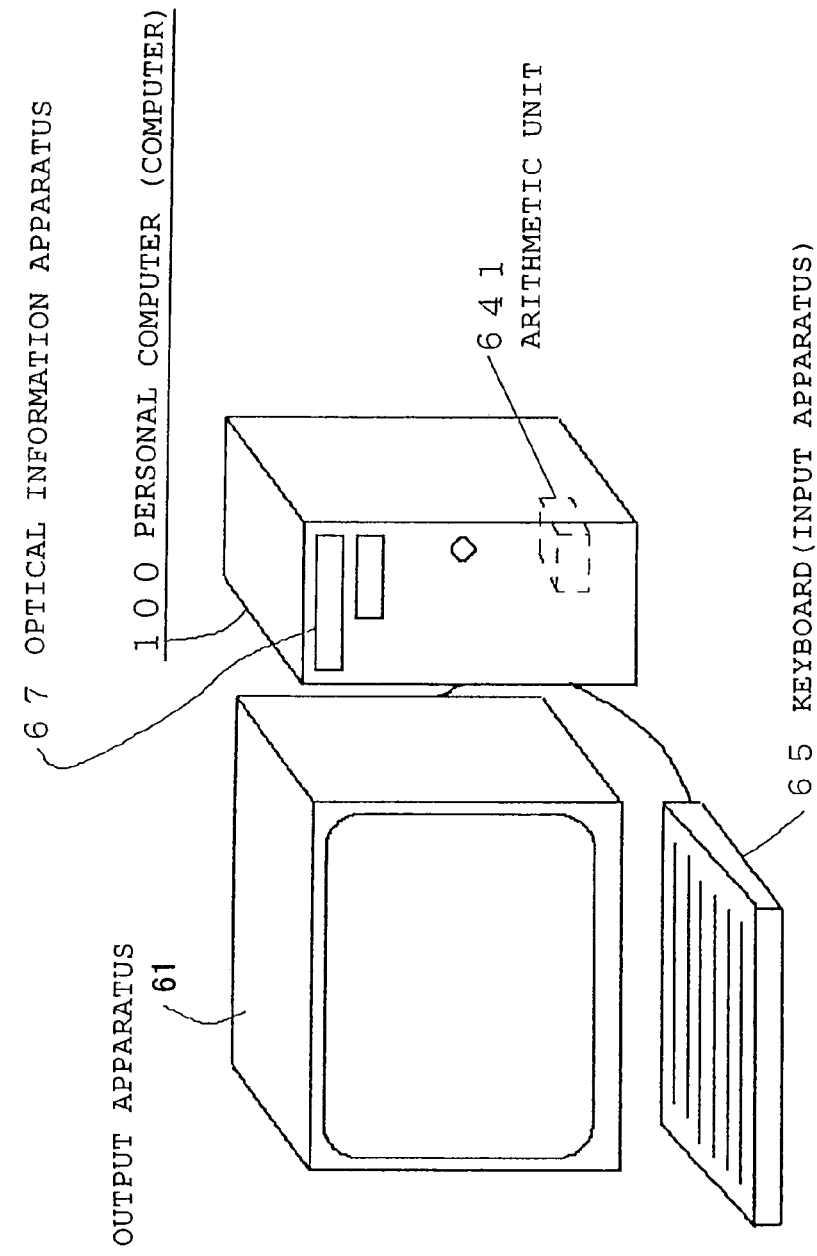
FIG. 6 is a schematic perspective view of the structure of a computer according to Embodiment 7 of the present invention.

In FIG. 6, a computer 100 is constructed of the optical information apparatus 67 according to Embodiments 1 to 6, an input apparatus 65 implemented by a keyboard, mouse or touch panel for inputting information, an arithmetic unit 641 implemented by a central processing unit (CPU), etc., which performs operations based on information input from the input apparatus 65 and information read from the optical information apparatus 67 and an output apparatus 61 implemented by a CRT, liquid crystal display apparatus or printer which displays information such as operation results of the arithmetic unit 641.

EMBODIMENT 8

Figure 7:
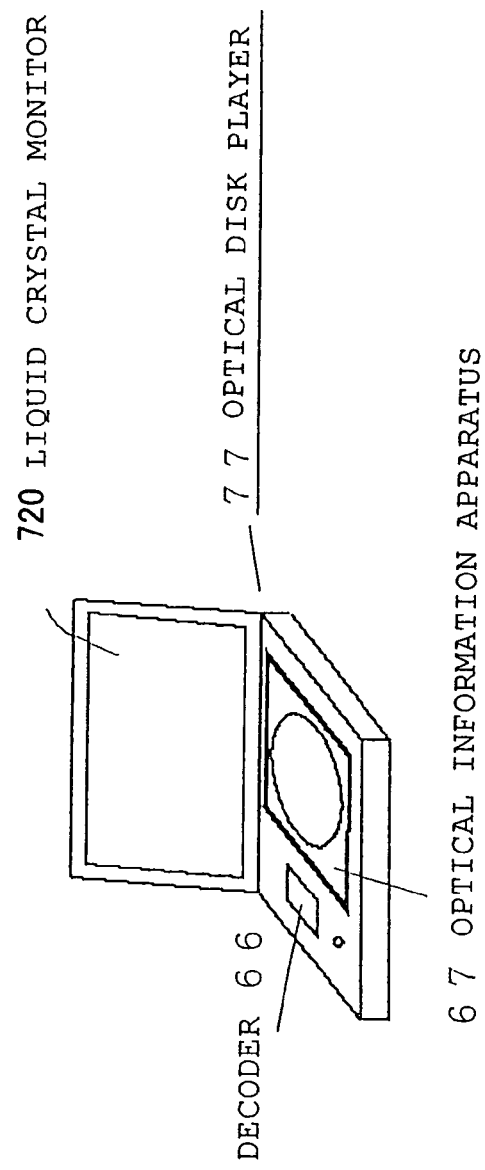
FIG. 7 is a schematic perspective view of the structure of an optical disk player and car navigation system according to Embodiment 8 of the present invention.

An embodiment of an optical disk player provided with the optical information apparatus 67 described in Embodiments 1 to 6 is shown in FIG. 7.

In FIG. 7, an optical disk player 77 is constructed of the optical information apparatus 67 according to Embodiments 1 to 6 and a decoder 66 as an apparatus which converts an information signal obtained from the optical information apparatus 67 to an image. Furthermore, this structure can also be used as a car navigation system. Furthermore, the apparatus of the present invention may also be used in a mode provided with a display apparatus 720 such as a liquid crystal monitor.

EMBODIMENT 9

An embodiment of an optical disk recorder provided with the optical information apparatus described in Embodiments 1 to 6 will be shown below.

Figure 8:
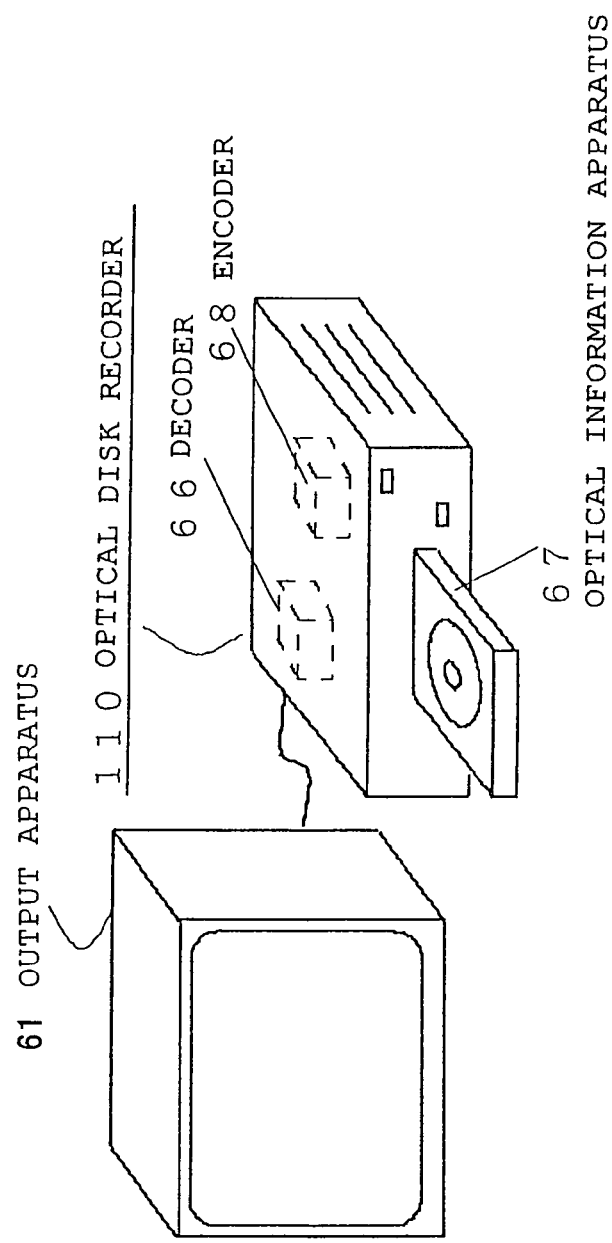
FIG. 8 is a schematic perspective view of the structure of an optical disk recorder according to an embodiment of the present invention.

Embodiment 9 will be explained using FIG. 8. In FIG. 8, an optical disk recorder is constructed of the optical information apparatus 67 according to Embodiment 7 and an encoder 68 as an apparatus which converts image information to information which is recorded in an optical disk by the optical information apparatus 67. Preferably by also including a decoder 66 as an apparatus which converts an information signal obtained from the optical information apparatus 67 to an image, it is also possible to reproduce an already recorded portion. The optical disk recorder may also include an output apparatus 61 which is implemented as a CRT, liquid crystal display apparatus or printer which displays information.

EMBODIMENT 10

Figure 9:
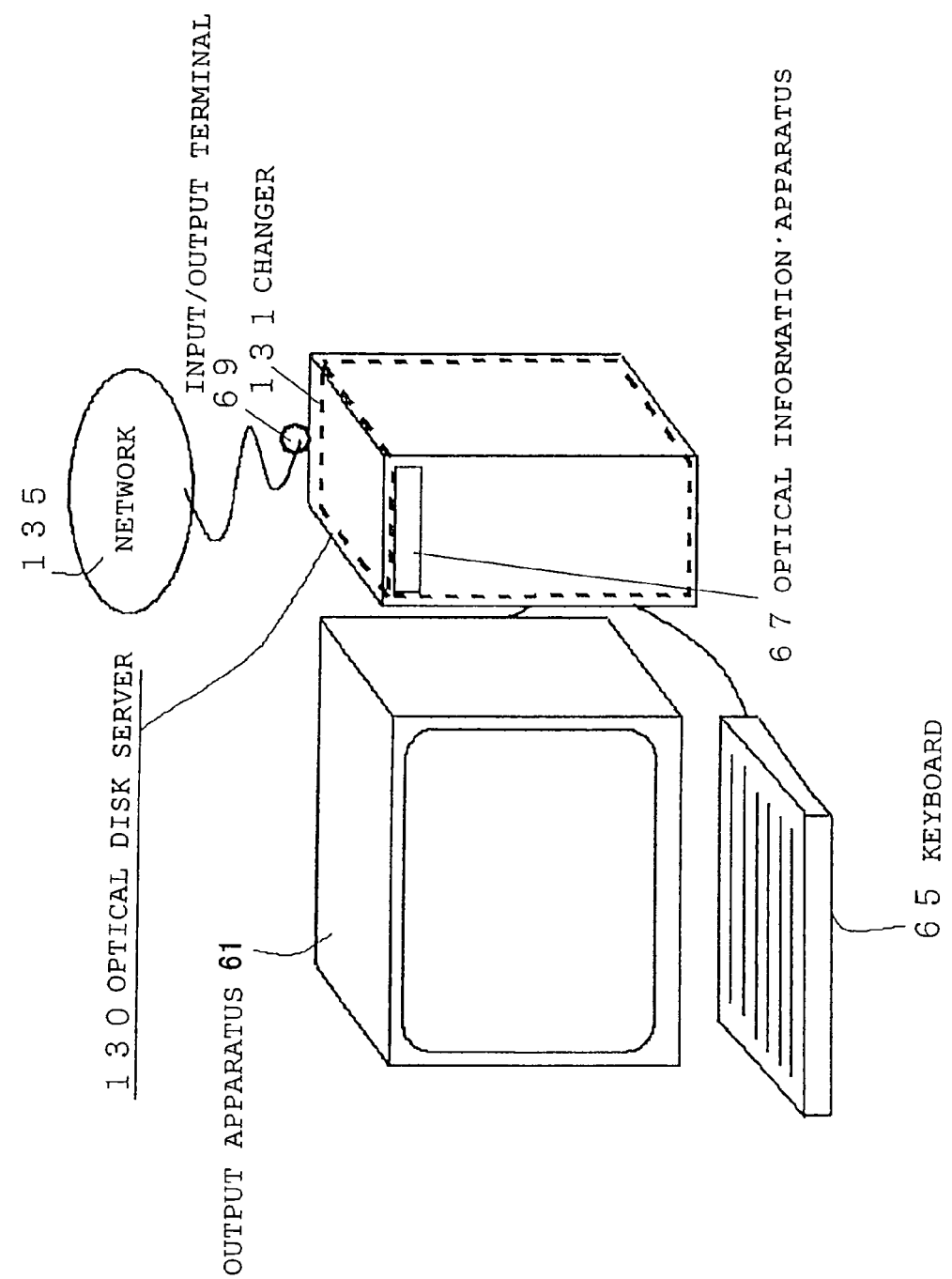
FIG. 9 is a schematic perspective view of the structure of an optical disk server according to an embodiment of the present invention.
Figure 10:
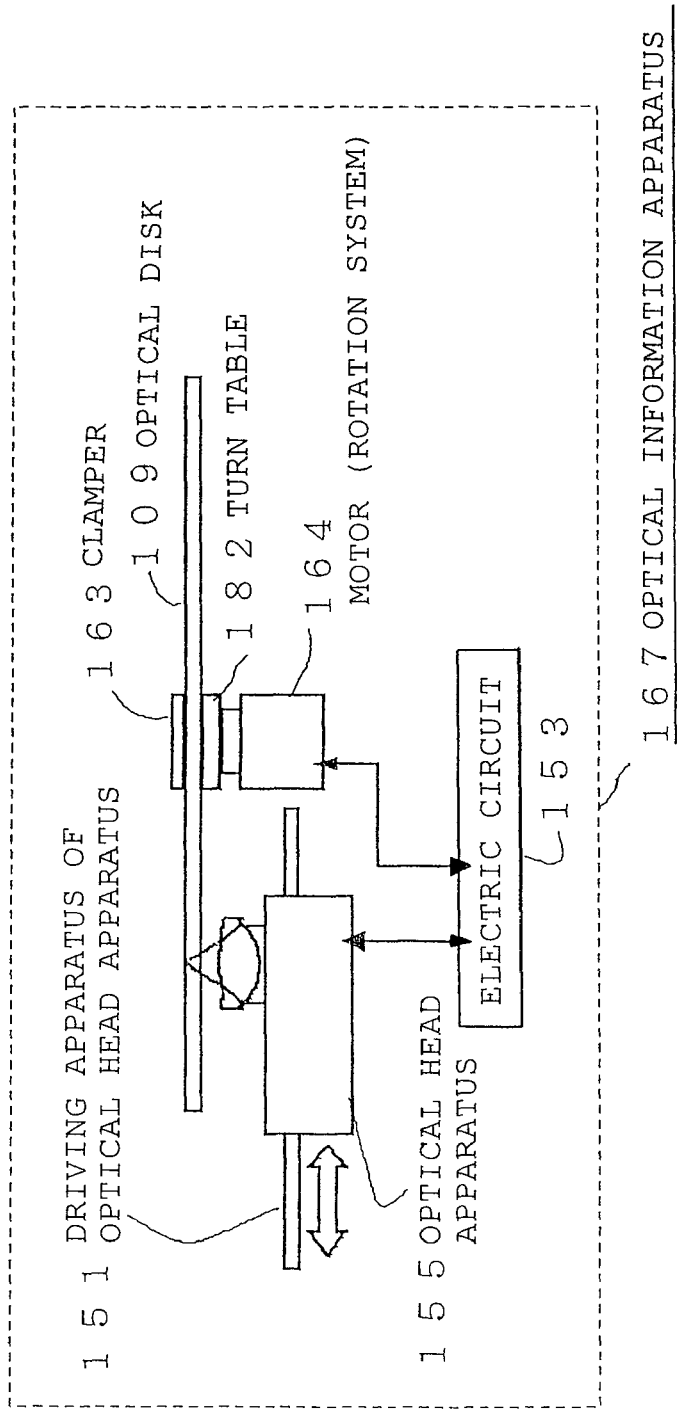
FIG. 10 is a schematic cross-sectional view of an optical information apparatus according to a conventional example.
Figure 11:
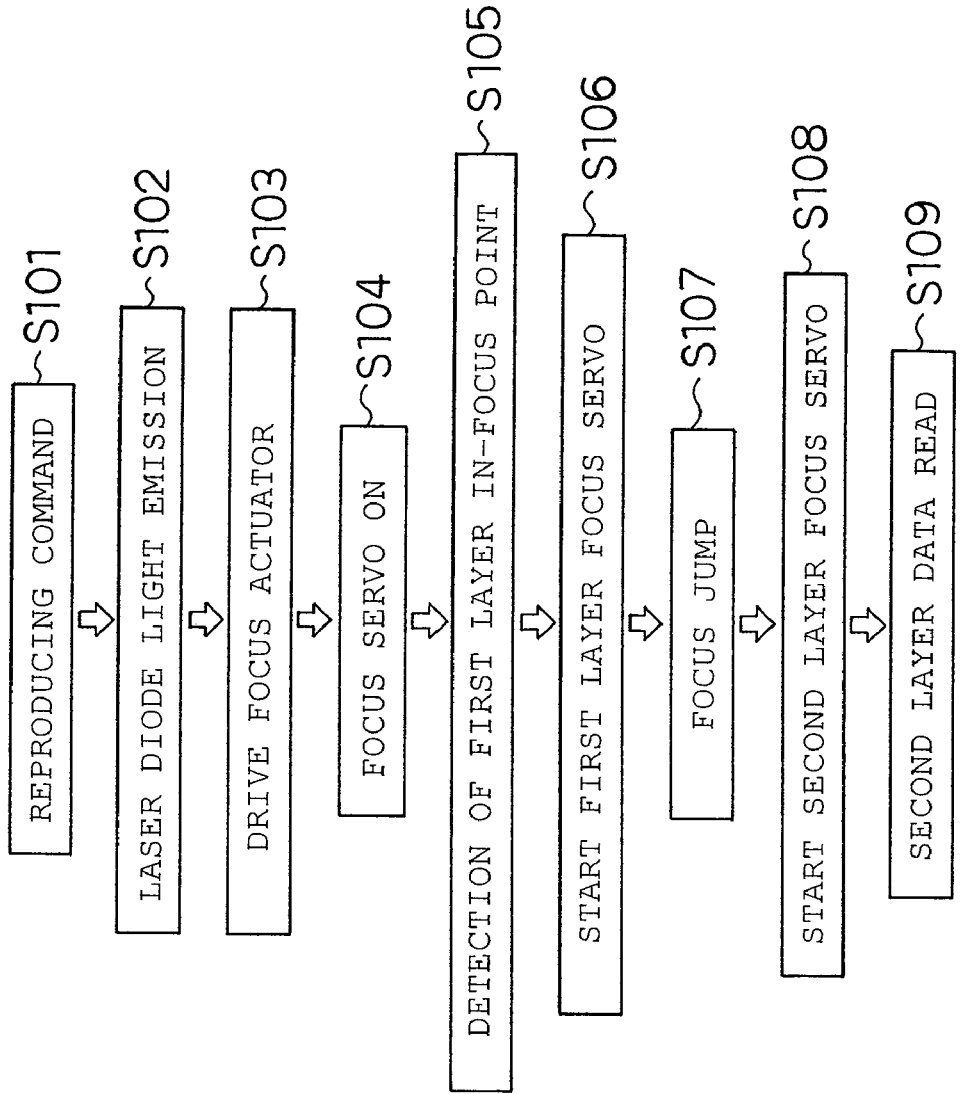
FIG. 11 is a flow chart showing a beam spot positioning method according to the conventional example.
Figure 12:
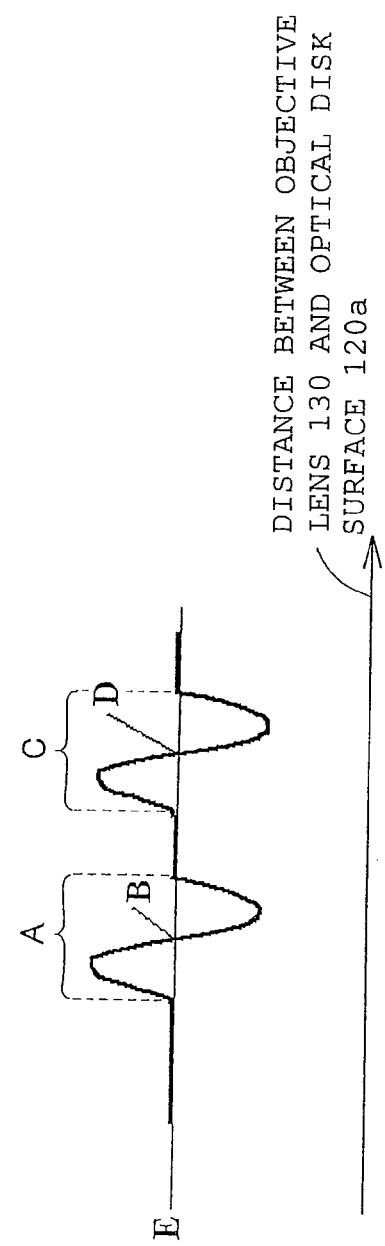
FIG. 12 illustrates a focus error signal according to the conventional example.
Figure 13:
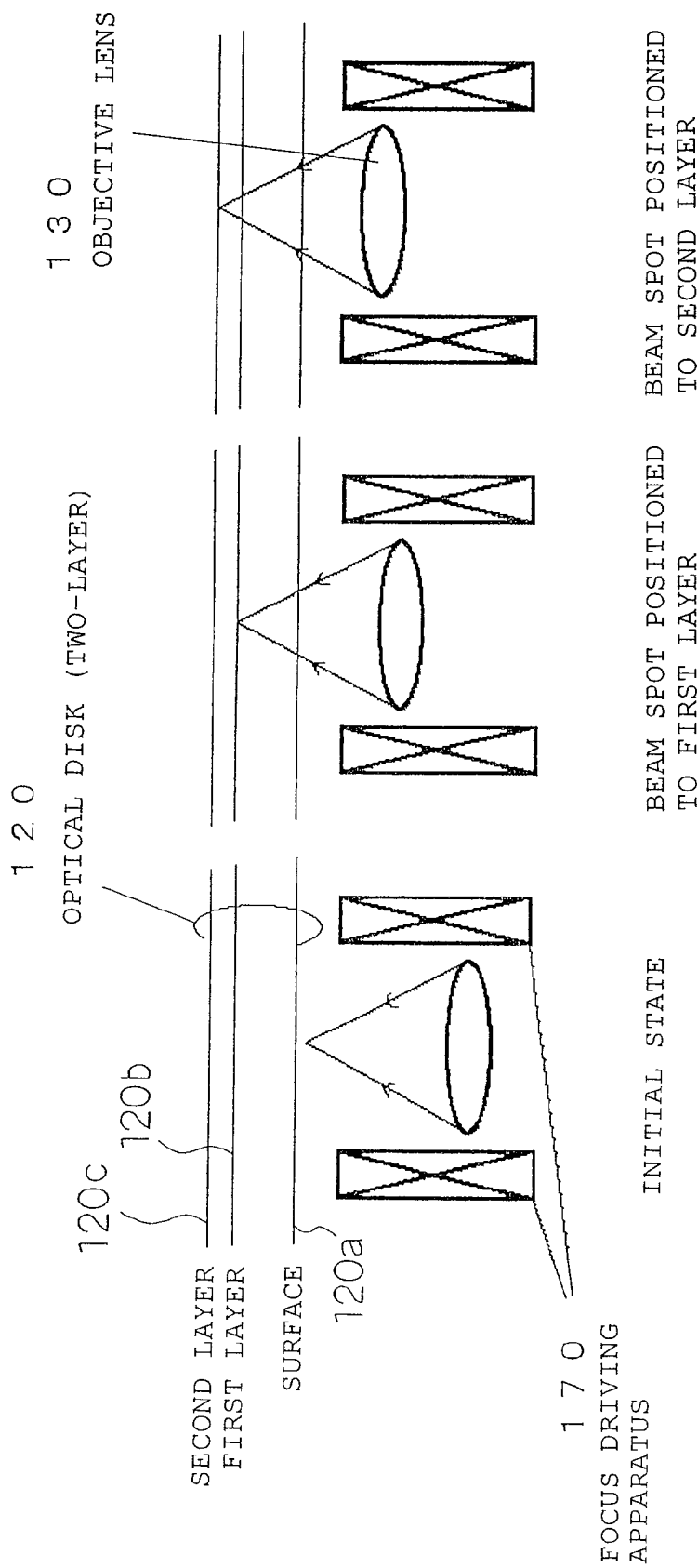
FIGS. 13(a), (b) and (c) are schematic cross-sectional views of a positional relationship between an optical disk and objective lens according to the conventional example.
Figure 14:
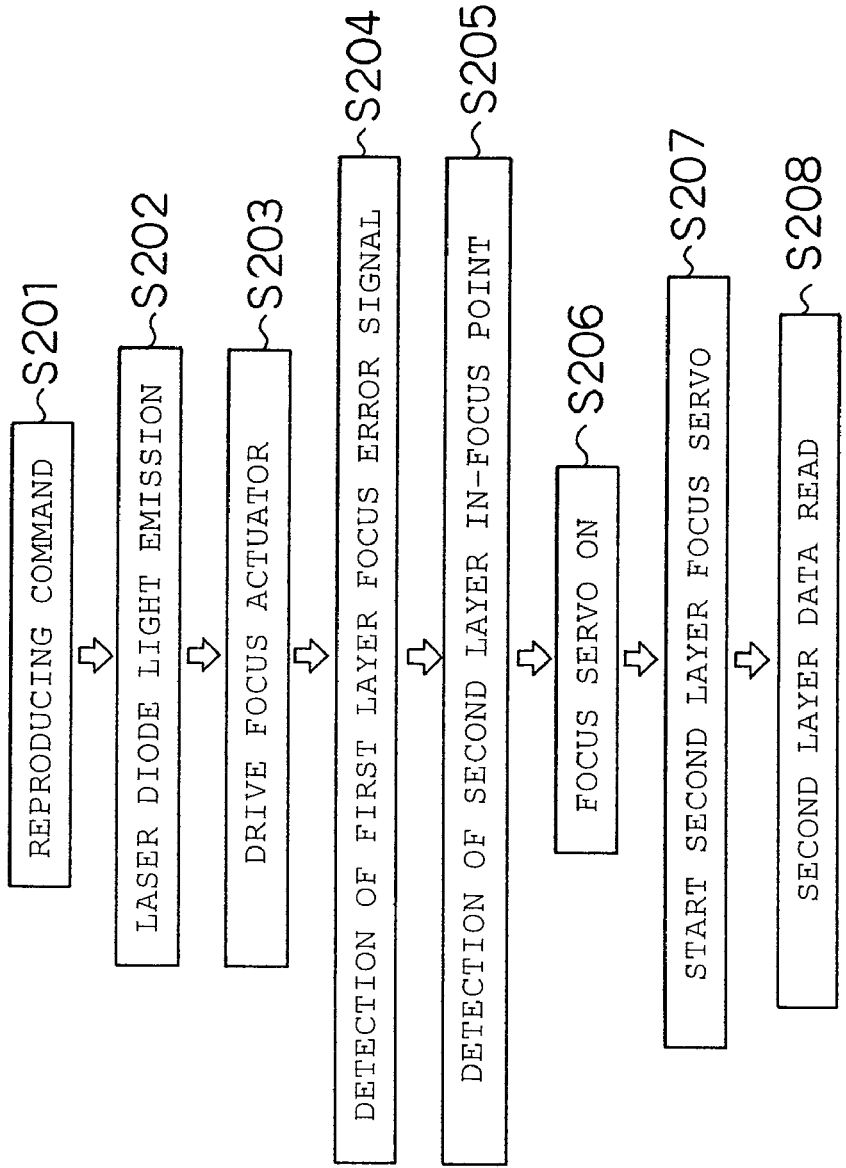
FIG. 14 is a flow chart showing a beam spot positioning method according to a conventional example.
Figure 15:
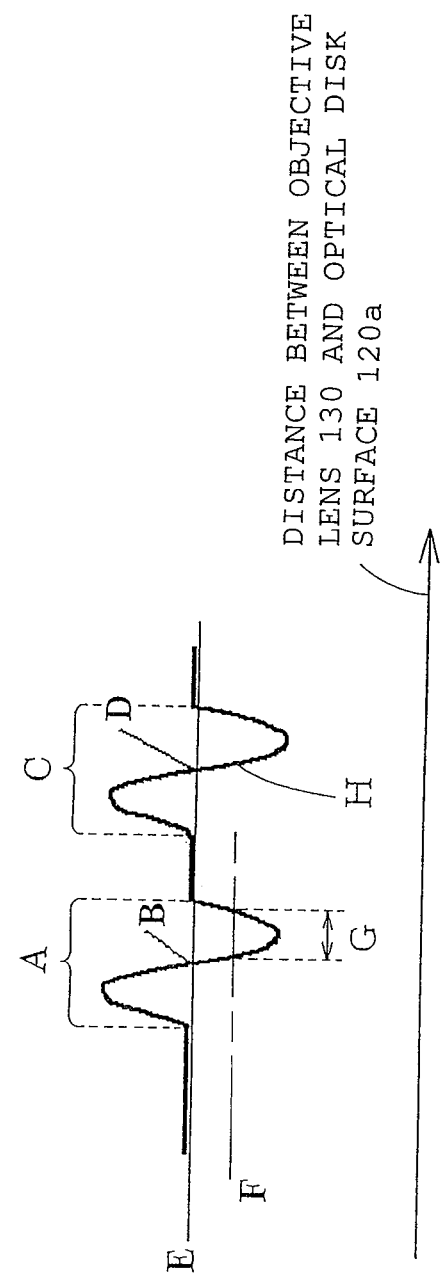
FIG. 15 illustrates a relationship between a focus error signal and slice signal according to the conventional example.

Embodiment 10 will be explained using FIG. 9. In FIG. 9, an optical information apparatus 67 is the optical information apparatus described in Embodiments 1 to 6. Furthermore, an input/output terminal 69 is a wired or wireless input/output terminal which inputs information to be recorded in the optical information apparatus 67 or outputs information read by the optical information apparatus 67 to the outside. This allows the present invention to be used as an information server (optical disk server) which exchanges information with a network, that is, a plurality of devices, for example, a computer, telephone, television tuner, etc., and which is shared by the plurality of devices. This allows optical disks of different types to be stably recorded or reproduced, thus having the effect of being applicable to a wide range of applications. It is also possible to include an output apparatus 61 which is implemented as a CRT, liquid crystal display apparatus or printer which displays information.

Furthermore, by also including a changer 131 which loads/unloads a plurality of optical disks into/from the optical information apparatus 67, it is possible to produce the effect of recording/storing a large volume of information.

Embodiments 7 to 10 have shown the output apparatus 61 and liquid crystal monitor 720 in FIGS. 6 to 9, but it is also possible to adopt a structure provided with only output terminals for connections with these devices. In this case, it is possible to provide a mode in which the output apparatus 61 and liquid crystal monitor 120 are not provided, but these devices are made available separately as required. Furthermore, FIG. 7 and FIG. 8 show no input apparatus, but it is also possible to adopt a mode provided with an input apparatus such as a keyboard, touch panel, mouse, remote control apparatus, etc. On the contrary, in Embodiments 7 to 10 above, it is also possible to adopt a mode in which the input apparatus is provided separately and only input terminals for connections with the input apparatus are included.

In the above described embodiments, the optical head apparatus 55 including the focus driving apparatus 171 corresponds to the moving means of the present invention, the objective lens 131 corresponds to the objective lens of the present invention and the electric circuit 53 corresponds to the control means of the present invention. Furthermore, the slice level voltage such as the slice level voltage H, G used for the first detection of a focus error signal in S4 corresponds to the first slice level voltage of the present invention, the slice level voltage such as the slice level voltage H, G used for the second detection of a focus error signal during approaching movement in S6 corresponds to the second slice level voltage of the present invention, the slice level voltage such as the slice level voltage H, G used for the second detection of a focus error signal during backward movement corresponds to the third slice level voltage of the present invention. Furthermore, the slice level voltage such as slice level voltage $H_{high}$, $G_{low}$ used in Embodiment 4 corresponds to the fourth slice level voltage of the present invention. Furthermore, the personal computer 100, optical disk recorder 110 and optical disk server 130 provided with the optical information apparatus 67 correspond to the optical information reproducing apparatus, optical information recording apparatus and optical information recording/reproducing apparatus, and the optical disk player 77 corresponds to the optical information reproducing apparatus of the present invention.

Furthermore, in the above described embodiments, using an integrated circuit such as a semiconductor integrated circuit for the electric circuit 53 can reduce the size of the apparatus, provide lower power, and improve reliability.

Furthermore, the program according to the present invention is a program for causing a computer to execute the functions of the whole or part of the above described optical pickup driving apparatus of the present invention and can be a program which operates in cooperation with the computer.

Furthermore, the present invention may also be a medium carrying a program for causing a computer to execute the functions of the whole or part of the above described optical pickup driving apparatus of the present invention and can be a computer-readable medium, the program read from which executes the above described functions in cooperation with the computer.

The above described "part of the means" means some of a plurality of means or means part of the function of one means.

Furthermore, "some apparatuses" of the present invention means some of a plurality of apparatuses or means some means of one apparatus or means part of the function of one means.

Furthermore, a computer-readable recording medium which records the program of the present invention is also included in the present invention.

Furthermore, a mode of use of the program of the present invention may also be a mode in which the program is recorded in a computer-readable recording medium and operates in cooperation with the computer.

Furthermore, the recording medium includes a ROM, etc.

Furthermore, the above described computer of the present invention is not limited to pure hardware such as a CPU, but may also include firmware, OS or peripheral devices.

As described above, the structure of the present invention may be implemented by software or implemented by hardware.

The present invention exerts notable effects as an optical pickup driving apparatus and optical pickup beam spot positioning method, etc., that can perform beam spot positioning to a recording layer in the deepest part of a multi-layer disk in a short time and in a reliable manner, and is applicable to wide industrial fields including audio, video, and computer as a large-volume, removable, randomly accessible information storage apparatus such as various devices using an optical information apparatus which records/reproduces a single-layer or multi-layer optical disk, for example, video reproducing machine, video recorder, car AV system, audio device, storage apparatus for a computer, home server, business data backup apparatus, etc., and the range of industrial applicability thereof is wide and large.

The invention claimed is:

1. An optical pickup driving apparatus for focusing an optical spot on a single-layer recording surface or a plurality of multi-layered recording surfaces of an optical information recording medium, comprising:

moving means of moving an objective lens for focusing said optical spot on said recording surface of said optical information recording medium in a direction of the optical axis of said optical spot; and control means of controlling said moving means based on a voltage of a focus error signal based on reflected light from said optical spot, wherein said control means controls said moving means so that said moving means moves said objective lens toward said recording surface, and when said control means detects that the voltage of said focus error signal has reached a first slice level voltage corresponding to displacement of predetermined magnitude from a reference potential, said moving means moves said objective lens toward said recording surface by a maximum of an upper limit of a predetermined amount of movement, and when the amount of movement of said objective lens has reached said predetermined amount of movement, said moving means moves said objective lens away from said recording surface, and when said control means newly detects that the voltage of said focus error signal has reached a second slice level voltage corresponding to displacement of predetermined magnitude from said reference potential before the amount of movement of said objective lens reaches said predetermined amount of movement, said control means controls beam spot positioning so as to focus the optical spot.

2. The optical pickup driving apparatus according to claim 1, wherein the voltage of said focus error signal alters in positive and negative directions with respect to said reference potential according to the movement of said objective lens, and said control means detects either a voltage higher or lower than said reference potential as said first slice level voltage.

3. The optical pickup driving apparatus according to claim 2, wherein said control means uses the voltage higher or lower than said reference potential as said first slice level voltage, whichever is detected first.

4. The optical pickup driving apparatus according to claim 1, wherein the voltage of said focus error signal fluctuates in positive and negative directions with respect to said reference potential according to the movement of said objective lens, and said control means detects both a voltage higher and lower than said reference potential as said first slice level voltage.

5. The optical pickup driving apparatus according to claim 1, wherein when said control means detects that said objective lens has reached a third slice level voltage corresponding to displacement of predetermined magnitude from the reference potential for a period of a backward movement, said control means controls beam spot positioning so as to focus the optical spot.

6. The optical pickup driving apparatus according to claim 5, wherein said control means detects either a voltage higher or lower than said reference potential as said second slice level voltage or said third slice level voltage.

7. The optical pickup driving apparatus according to claim 6, wherein said control means uses the voltage higher or lower than said reference potential as said second slice level voltage or said third slice level voltage, whichever is detected first.

8. The optical pickup driving apparatus according to claim 5, wherein the magnitudes of displacement of said first slice level voltage, said second slice level voltage and said third slice level voltage from said reference potential are substantially the same.

9. The optical pickup driving apparatus according to claim 5, wherein the magnitude of displacement of said first slice level voltage from said reference potential is greater than the magnitude of displacement of said second slice level voltage and said third slice level voltage from said reference potential.

10. The optical pickup driving apparatus according to claim 9, wherein the magnitudes of displacement of said second slice level voltage and said third slice level voltage from said reference potential are substantially the same.

11. The optical pickup driving apparatus according to claim 1, wherein said optical information recording medium has a plurality of multi-layered recording surfaces, and said predetermined amount of movement is given by a moving distance L from a current position of said optical pickup when said first slice level voltage is reached and said moving distance L is defined by:

$$L = d/n \times (1+c) \qquad \text{(Formula 1)}$$

where d is a maximum value of the distance between said recording layers of said optical information recording medium, n is a refractive index of said optical information recording medium, and c is a sensitivity difference.

12. The optical pickup driving apparatus according to claim 1, wherein when said control means detects that the voltage of said focus error signal has reached a fourth slice level voltage at which the displacement from said reference potential is greater than the displacement of said first slice level voltage from said reference potential, said control means controls beam spot positioning so as to focus said optical spot.

13. The optical pickup driving apparatus according to claim 1, wherein said control means is formed on an integrated circuit.

14. An optical information reproducing apparatus provided with means of reading information recorded in an optical information recording medium, said reading means using the optical pickup driving apparatus according to claim 1.

15. An optical information recording apparatus provided with recording means of recording information in an optical information recording medium, said recording means using the optical pickup driving apparatus according to claim 1.

16. An optical information recording/reproducing apparatus provided with recording/reproducing means of recording and/or reproducing information in/from an optical information recording medium, said recording/reproducing means using the optical pickup driving apparatus according to claim 1.

17. An optical pickup beam spot positioning method for focusing an optical spot on a single-layer recording surface or a plurality of multi-layered recording surfaces of an optical information recording medium, comprising:

a moving step of moving an objective lens for focusing said optical spot on said recording surface of said optical information recording medium in a direction of the optical axis of said optical spot; and a control step of controlling said moving means based on a voltage of a focus error signal based on reflected light from said optical spot, wherein said control step controls said moving step so that said objective lens moves toward said recording surface, and when it is detected that the voltage of said focus error signal has reached a first slice level voltage corresponding to displacement of predetermined magnitude from a reference potential, said objective lens moves toward said recording surface by a maximum of an upper limit of a predetermined amount of movement, and when the amount of movement of said objective lens has reached said predetermined amount of movement, said objective lens moves away from said recording surface, and in said control step, when it is newly detected that the voltage of said focus error signal has reached a second slice level voltage corresponding to displacement of predetermined magnitude from said reference potential before the amount of movement of said objective lens reaches said predetermined amount of movement, control of beam spot positioning is performed so as to focus the optical spot.

18. The optical pickup beam spot positioning method according to claim 17, wherein the voltage of said focus error signal fluctuates in positive and negative directions with respect to said reference potential according to the movement of said objective lens, and in said control step, either a voltage higher or lower than said reference potential is detected as said first slice level voltage.

19. The optical pickup beam spot positioning method according to claim 18, wherein in said control step, the voltage higher or lower than said reference potential is used as said first slice level voltage, whichever is detected first.

20. The optical pickup beam spot positioning method according to claim 17, wherein the voltage of said focus error signal fluctuates in positive and negative directions with respect to said reference potential according to the movement of said objective lens, and in said control step, both a voltage higher and lower than said reference potential are detected as said first slice level voltage.

21. The optical pickup beam spot positioning method according to claim 17, wherein when it is detected that said objective lens has reached a third slice level voltage corresponding to displacement of predetermined magnitude from the reference potential for a period of a backward movement, said control step controls beam spot positioning so as to focus the optical spot.

22. The optical pickup beam spot positioning method according to claim 21, wherein in said control step, either a voltage higher or lower than said reference potential is detected as said second slice level voltage or said third slice level voltage.

23. The optical pickup beam spot positioning method according to claim 22, wherein in said control step, the voltage higher or lower than said reference potential is used as said second slice level voltage or said third slice level voltage, whichever is detected first.

24. The optical pickup beam spot positioning method according to claim 21, wherein the magnitudes of displacement of said first slice level voltage, said second slice level voltage and said third slice level voltage from said reference potential are substantially the same.

25. The optical pickup beam spot positioning method according to claim 21, wherein the magnitude of displacement of said first slice level voltage from said reference potential is greater than the magnitudes of displacement of said second slice level voltage and said third slice level voltage from said reference potential.

26. The optical pickup beam spot positioning method according to claim 25, wherein the magnitudes of displacement of said second slice level voltage and said third slice level voltage from said reference potential are substantially the same.

27. The optical pickup beam spot positioning method according to claim 17, wherein said optical information recording medium has a plurality of multi-layered recording surfaces, and said predetermined amount of movement is given by a moving distance L from a current position of said optical pickup when said first slice level voltage is reached and said moving distance L is defined by:

$$L = d/n \times (1+c) \quad \text{(Formula 1)}$$

where d is a maximum value of the distance between said recording layers of said optical information recording medium, n is a refractive index of said optical information recording medium, and c is a sensitivity difference.

28. The optical pickup beam spot positioning method according to claim 17, wherein in said control step, when it is detected that the voltage of said focus error signal has reached a fourth slice level voltage at which the displacement from said reference potential is greater than the displacement of said first slice level voltage from said reference potential, control of beam spot positioning is performed so as to focus said optical spot.

29. A non-transitory computer readable recording medium carrying a program of causing a computer to perform the moving step and control step according to claim 17.

\* \* \* \* \*